United States Patent [19]

Etra

[11] 4,264,926

[45] Apr. 28, 1981

[54] THREE DIMENSIONAL TELEVISION SYSTEM

[76] Inventor: William Etra, 2355 Mastlands Dr., Oakland, Calif. 94611

[21] Appl. No.: 144

[22] Filed: Jan. 2, 1979

[51] Int. Cl.³ .............................................. H04N 9/56
[52] U.S. Cl. ........................................ 358/91; 358/105
[58] Field of Search ....................... 354/100, 103, 112; 352/57, 60; 358/3, 89, 91, 105, 136, 140, 167

[56] References Cited

U.S. PATENT DOCUMENTS

| | | | |
|---|---|---|---|
| 2,865,988 | 12/1958 | Cafarelli, Jr. ......................... | 358/89 |
| 3,715,480 | 2/1973 | Etra ..................................... | 358/105 |
| 3,896,487 | 7/1975 | Tesler .................................. | 358/3 |
| 4,027,331 | 5/1977 | Nicol .................................... | 358/136 |
| 4,096,525 | 6/1978 | Lathan ................................. | 358/105 |

*Primary Examiner*—Benedict V. Safourek
*Attorney, Agent, or Firm*—Darby & Darby

[57] ABSTRACT

Apparatus is disclosed for transmitting video signals which produce images that can be viewed comfortably as two-dimensional images but when viewed through special glasses appear to be three dimensional. An illusion of depth is created for scenes including a moving object by combining one chrominance component of a past field with the luminance component of the current field. By "registering" the moving objects of the past and current fields, the background (stationary) objects of the past and current fields are displaced slightly relative to each other. These displaced images appear in complementary colors and can be viewed normally if the displacement is slight, with an unobjectionable color fringe. When viewed through appropriately filtered glasses, the displaced images create a three dimensional illusion.

6 Claims, 3 Drawing Figures

PAST FIELD (CYAN)

CURRENT FIELD (MAGENTA)

PAST FIELD IN REGISTRY

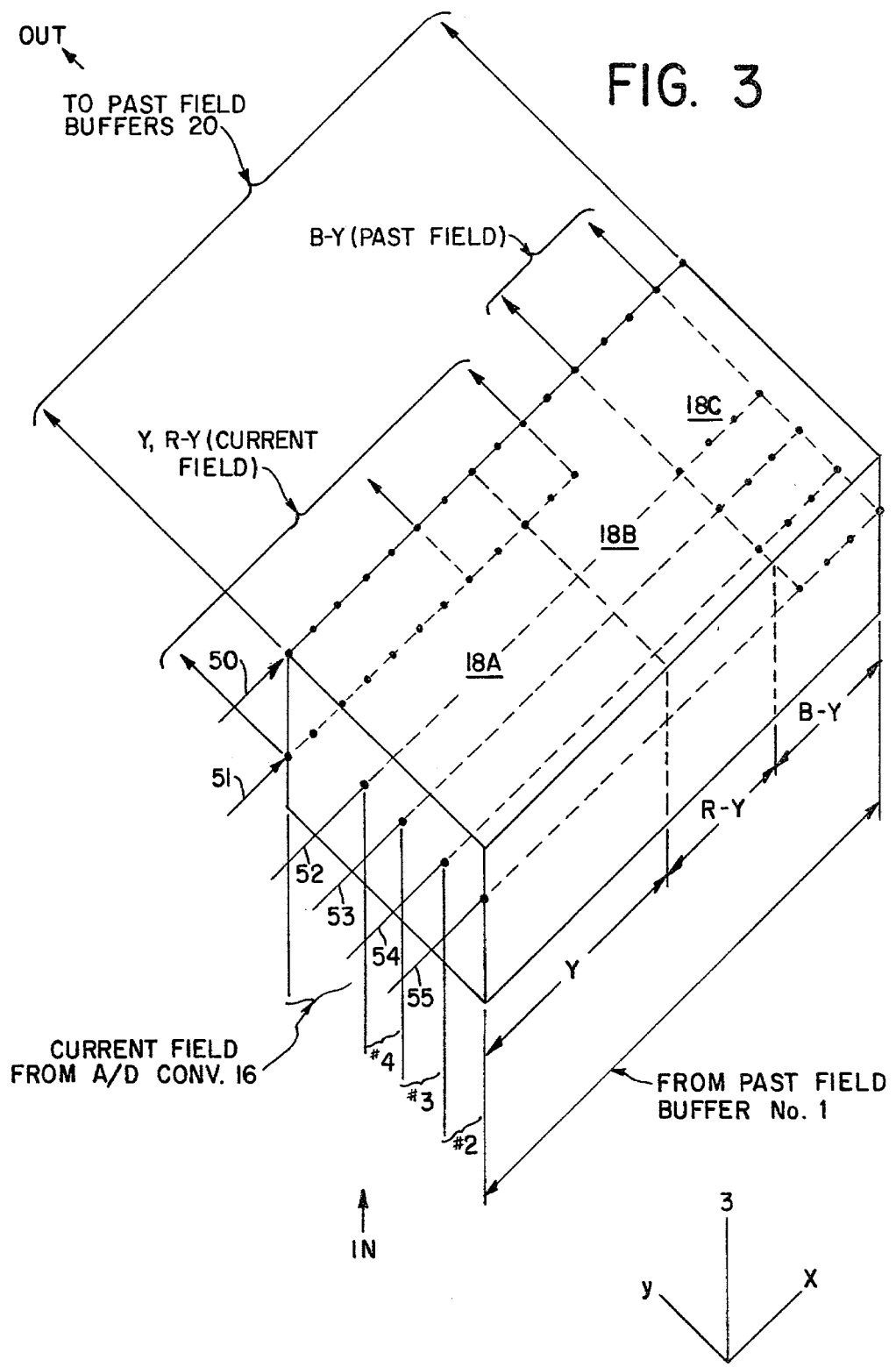

THREE DIMENSIONAL TELEVISION SYSTEM

BACKGROUND OF THE INVENTION

This invention relates to video signal processing. More specifically, this invention concerns real time processing of video signals for the purpose of creating a three dimensional effect.

Three dimensional or stereoscopic viewing generally requires the production of disparate left and right images. Most conventional three dimensional techniques produce images which are not compatible, i.e. which cannot be viewed comfortably without specially filtered glasses. Songer (U.S. Pat. No. 3,712,199) has disclosed an anaglyph (i.e. color encoded) stereoscopic system capable of producing a compatible three dimensional image. The image is compatible in that when it is viewed without the specially filtered glasses required for stereoscopy, it is seen as an acceptable two-dimensional image.

In Songer, image separation (sometimes referred to as binocular disparity) is created by a color fringing effect on the out-of-focus objects. For example, objects fore of the plane of focus may be imaged with a magenta defocus blur on the left side and a cyan defocus blur on the right side. Objects aft of the plane of focus will be encoded in the opposite sense, i.e. cyan on the left and magenta on the right. When viewed through appropriately filtered glasses, disparate out of focus images are seen causing the viewer to perceive what is termed by Songer as "psychophysiological 3-D". Without the glasses, the defocus blurs are barely noticeable and the image is perceived as a normal two-dimensional picture.

Although Songer's system is applicable to television, it has certain drawbacks which limit its applicability to this medium. In the first place, since image disparity is created by a defocus blur, a lens system with very low depth of focus (e.g. telephoto lenses) will not produce sufficient color fringing to create a three dimensional affect. Such lenses are frequently used for television, particularly for sporting events.

Secondly, the cost involved in modifying existing television cameras in accordance with the Songer system is prohibitive.

OBJECT OF THE INVENTION

The main object of this invention is to provide a practical apparatus and method for processing standard video signals so as to enable compatible three dimensional television using standard television receivers.

The present invention requires no modification of existing lens systems and can produce compatible three dimensional images regardless of the depth of focus of the taking lens.

Because the illusion of depth, in accordance with the invention, is based on object movement, the invention can be used to process pre-recorded video signals to produce compatible stereoscopic images.

SUMMARY OF THE INVENTION

In accordance with the invention, a three dimensional effect requires that there be movement of at least one object in the scene being viewed. One of the chrominance components of the video signal corresponding to a preselected past field is combined with the complementary chrominance component of the current field in such a way as to produce disparate color encoded images, preferably in the background, due to the object movement. When viewed normally, the disparate images are blurred slightly but not so much as to be objectionable. When viewed through appropriately filtered glasses, the image disparity produces a realistic three dimensional effect.

THE DRAWINGS

The invention is described in detail below with reference to the attached drawings, wherein:

FIG. 3 is a schematic illustration of a preferred switching network for use with the invention.

DETAILED DESCRIPTION

Figure 1:
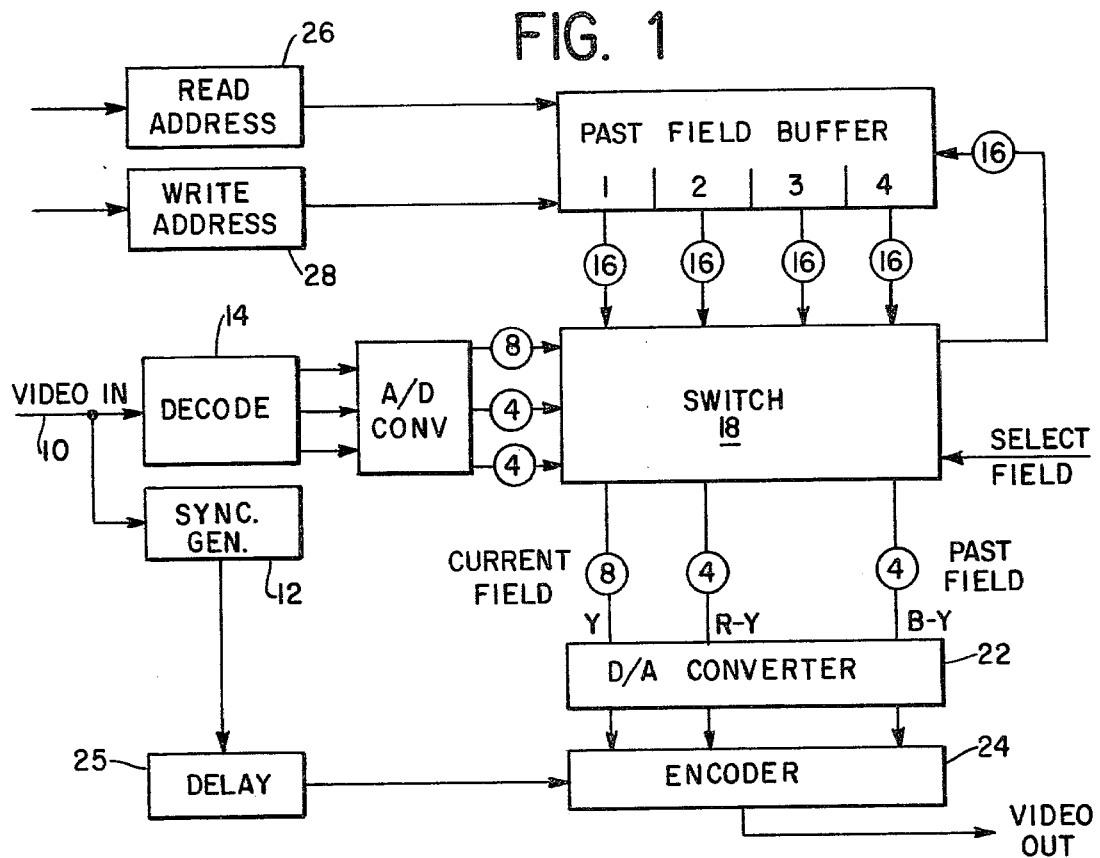
FIG. 1 is a block diagram of the invention.

In FIG. 1, a conventional incoming color video signal (from a camera or recorder) appears on line 10. This signal is fed to a sync generator 12 and a decoder 14. The sync generator 12 produces the timing signals for the system which therefore is locked to the incoming video. Decoder 14 separates the video signal into its luminance (Y) and chrominance (R-Y and B-Y) components. As is well known, all of the required color information is contained in these complementary R-Y (magenta) and B-Y (cyan) components.

The decoder outputs are coupled to an analog-to-digital converter 16 which samples the three components and converts each sample to a discrete digital value. For example, each analog signal may be sampled at four times the NTSC subcarrier frequency (e.g. about 15 MHz) with the luminance samples converted into eight bit words and the chrominance samples into four bit words. This is indicated in FIG. 1 by the numerals "8" and "4" placed within circles at the outputs of analog-to-digital converter 16.

The sync generator 12, decoder 14 and analog-to-digital converter 16 may be conventional, commercially available devices.

The illusion of depth requires binocular disparity. That is, the left eye must see an image displaced slightly from the image seen by the right eye. In accordance with the invention, binocular disparity is created by the change in position, from field to field, which exists in the case of an object moving in the scene being viewed (in the United States, a field includes 262.5 horizontal lines; a raster consists of two interlaced fields).

The way in which the invention produces a three dimensional effect is explained with reference to FIGS. 2A–2E. Consider a scene consisting of a circle and a square (FIG. 2A), with the square being movable toward the circle. Assume also that the square moves at a rate such that from field to field it moves the distance "d". In this case, FIGS. 2A and 2B may be considered to represent successive fields, with FIG. 2A representing a "past" field and FIG. 2B representing the "current" field.

Because of the movement of the square, the relative position of the square changes from the past to the current field. Consequently, if the two fields are encoded in complementary colors (e.g. cyan and magenta), by combining the two fields a color fringing effect of the type disclosed by Songer can be achieved. Thus, consider the past field of FIG. 2A to be magenta (corresponding, for example, to the R-Y chrominance component) and the current field of FIG. 2B to be cyan (B-Y). If these two fields are combined as shown in FIG. 2C, the circle (which has not been displaced) will include both cyan and magenta images in full registry and will therefore appear in its proper color. The square, however, which has been displaced by the distance "d" will consist of a central portion 40 including both cyan and magenta together with a magenta fringe 42 and a cyan fringe 44.

If the composite image of FIG. 2C is viewed through magenta/cyan glasses, the disparity in position of the square appears as though it were a true binocular disparity and the viewer will perceive the same psychophysiological 3-D effect in the Songer system.

Figure 2A:
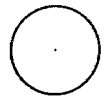
FIG. 2 is an explanatory diagram showing how binocular disparity is created in accordance with the invention.
Figure 2B:
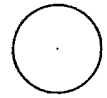
Figure 2C:
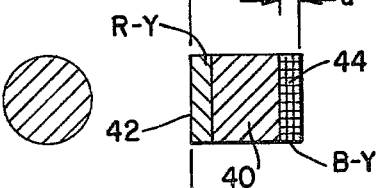
Figure 2D:

Although a three dimensional affect can be achieved by combining the two fields of FIGS. 2A and 2B, the addition of the color fringes to the moving object is objectionable since the moving object is normally the major object of interest. For compatibility it is preferable that the major object of interest (corresponding to the in-focus object in Songer) consist of the registered image components with the stationary objects (usually in the background) including the color fringes. This effect can be achieved by registering the moving objects of successive fields as explained with reference to FIGS. 2D and 2E.

FIG. 2B shows the image of the past field shifted left the distance "d" so that the moving squares of the past and current fields are in exact registry and the stationary circles are out of registry. If these images are color encoded as described above and combined, the composite image of FIG. 2E results. In this composite image, the entire moving square is in full color whereas the stationary circle includes a central full colored core 46 with magenta and cyan fringes 48 and 50, respectively. Since the same binocular disparity exists in FIG. 2 as in FIG. 2C, the same psychophysiological 3-D effect is achieved but compatability is enhanced since the principal object of interest (the moving square) no longer includes the requisite color fringes.

Figure 2E:
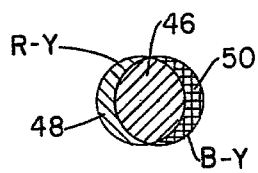

As described below, the system shown in FIG. 1 produces the past and current fields corresponding to FIGS. 2A and 2B, shifts the past field so that the moving objects of the two fields are in registry, and then combines complementary chrominance components of the two fields to produce a composite color encoded field corresponding to FIG. 2E. In effect, the color fringes are transferred from the moving object to the stationary object.

To transfer the color fringes, in accordance with a preferred embodiment of the invention, the digital signals from converter 16 are fed to a switching network 18. Switch 18 routes the digital signals throughout the system and will be computer controlled. The digital signals corresponding to the last four fields of the original television picture are routed to a past field buffer 20 for temporary storage so that the operator can change the image disparity (for example, depending on the object speed) between the current field and the selected field.

The output of each of the past field buffers 20 is returned to the switching network 18. The switch 18, as explained in further detail below, selects the luminance component and one of the chrominance components (e.g. R-Y) of the current field and couples these signals to two inputs of a digital-to-analog converter 22. The complementary chrominance component (e.g. R-Y) of the selected past field is coupled through switch 18 to a third input of digital-to-analog converter 22 which then produces three video signals corresponding, respectively, to the luminance and R-Y chrominance component of the current field and the B-Y chrominance component of the selected past field.

The three outputs of the converter 22 are combined in an encoder 24 which also adds the appropriate timing signals from the sync generator 12, suitably delayed by a delay line 25 to compensate for the operation of the system as described.

The operation of the past field buffers 20 is under control of a read address circuit 26 and a write address circuit 28. In a well-known manner, these devices select starting addresses for the reading and writing operations and enable the selected data to be written in or read from memory.

Without further modification, the video signal of the encoder 24 would produce the type of image shown in FIG. 2C, i.e. with a color fringe on the moving objects only. However, the arrangement shown in FIG. 1 enables the moving object(s) of the selected past and current fields to be brought into registration by retarding or advancing the starting address of the read address counter 26. Thus, if it were desired to shift the past field of FIG. 2A to the position of FIG. 2D, the read address circuit 26 would advance the read-out of the selected past field buffer 20 to thereby shift the image on the screen to the left. The effect, as explained above, is to move the color fringing to the stationary objects which are usually in the background.

Registration of the moving objects may be manual or automatic. If manual, the operator will monitor the video image and adjust the starting address of the read address circuit 26 so that the moving object includes no color fringe (i.e. the moving objects of the past and current fields are in registry). Continuous monitoring will not normally be required if the moving objects move at an approximately constant rate. For automatic control, the computer may be programmed to compare the relative moving object position and adjust the read address circuit 26 accordingly.

Four past fields are stored in the buffers 20 so that the operator can choose one of four fields to compare with the current field in order to provide adequate image disparity as rates of movement change. For rapidly moving objects, adequate separation may be possible by combining the images of successive fields. Slower moving objects may require combination of the third or fourth past field with the current field to yield adequate disparity. This selection, of course, will be operator controlled through the computer and switching network 18.

Each of the past field buffers 20 stores a digital representation of a single video field. This may comprise 263 horizontal lines of 390 "dots" each. As noted previously, each "dot" includes light luminance bits and form bits for each of the two chrominance components (R-Y and B-Y). This enables the production of sixty-four different colors and/or shades of gray.

FIG. 3 shows diagrammatically a three-dimensional switching network which can be used to route the signals to the various locations shown in FIG. 1. The inputs and outputs in FIG. 3 are labeled to correspond to FIG. 1 with many individual input lines being omitted for the purposes of clarity. Thus, the 16-line input from each of the four past field buffers 20 is represented by only a single input line or (in the case of buffer No. 1) by the first and last lines.

At each intersection in the switch, there is a solid state gate which, in well-known fashion, can be opened by a suitable control voltage to pass the input voltage on its input terminal to an output terminal. To show diagrammatically the switch action, dots have been placed at the intersections of the switch where switching takes place. The inputs to the switch are shown as entering from the bottom, i.e. in the ZX plane. The outputs are shown at the top in the XY plane.

For purposes of the switching operation as shown in FIG. 1, six separate control lines 50–55 are shown. The application of a control voltage to line 50 couples the 16-bit current field signal (from the analog-to-digital converter 16) to the past field buffers 20. Application of a control signal to line 51 couples the luminance and R-Y chrominance component of the current field to the digital-to-analog converter 22. Application of a control signal to any of lines 52, 53, 54 or 55 will couple the complementary chrominance component (B-Y) of the selected past field (depending on which of the control lines is energized) to the third input of converter 22. Of course, because of the speed of operation, the switching effort will be computer-controlled.

Because of the switching configuration, the switch may be considered to be broken up into three separate sections 18A, 18B and 18C. Section 18A switches all of the luminance information whereas the chrominance components are switched by the sections 18B (R-Y) and 18C (B-Y).

What is claimed is:

1. A process for producing a video signal for compatible stereoscopic viewing, comprising combining a digital signal representing a selected chrominance component of a past video field with a digital signal representing the complementary chrominance component of a current video field to produce a composite video signal including both said selected and complementary chrominance components, and transmitting said composite video signal, said composite video signal producing a full color image on a standard television receiver.

2. A process for producing a video signal according to claim 1, including varying the synchronization of said selected component relative to said complementary component to produce a composite video signal corresponding to an image having background objects which include preselected color fringes.

3. A process for producing a video signal according to claim 1 or 2, wherein said composite video signal also includes the luminance component of said current video field.

4. Apparatus for generating a video signal for compatible stereoscopic viewing with appropriately filtered glasses, comprising
 decoder means for separating an incoming video signal into its luminance and complementary chrominance components,
 an analog-to-digital converter for converting said luminance and complementary chrominance components into digital signals at a predetermined sampling rate,
 field storage means for storing the digital signals corresponding to at least one past video field, and
 means for combining (A) one of the chrominance signals stored in said field storage means for a selected one of said past video signals and (B) the other chrominance signal and luminance signal for the current field to produce an output video signal.

5. Apparatus according to claim 4, including means responsive to a comparison of the image of said preselected field with the image of the current field for controlling the synchronization of the read-out of said field storage means to said combining means to control selectively the color fringing of a portion of the image.

6. Apparatus according to claim 4 or 5, wherein said field storage means stores at least two past video fields and said means for combining combines said one chrominance signal of a selected past field.

* * * * *